United States Patent [19]  [11] 4,120,986
Lynn  [45] Oct. 17, 1978

[54] WHOLE EGG REPLACER

[75] Inventor: Charles Carl Lynn, Longwood, Fla.

[73] Assignee: Stauffer Chemical Company, Westport, Conn.

[21] Appl. No.: 810,706

[22] Filed: Jun. 28, 1977

Related U.S. Application Data

[63] Continuation-in-part of Ser. No. 664,113, Mar. 5, 1976, abandoned.

[51] Int. Cl.$^2$ .............. A21D 13/00; A23L 1/32
[52] U.S. Cl. .................. 426/549; 426/558; 426/614; 426/615; 426/656; 426/658
[58] Field of Search ............ 426/584, 549, 550, 614, 426/637, 639, 656, 661, 558, 615, 658

[56] References Cited

U.S. PATENT DOCUMENTS 3,697,290 10/1972 Lynn .................................... 426/550
3,864,500 2/1975 Lynn ................................. 426/656 X Primary Examiner—Raymond N. Jones
Assistant Examiner—R. A. Yoncoskie
Attorney, Agent, or Firm—Paul J. Juettner

[57] ABSTRACT

A whole egg replacer is prepared by combining non-elastic protein material, oil and salt and heating at a low simmering temperature, adding a mild acid to the foregoing and continuing heating for a period of time sufficient to bring out flavor characteristics, adding water and vegetables and boiling, adding additional water and non-elastic protein material, continuing boiling, adding a thickening agent, continuing boiling and then drying to obtain a material of high protein content. This high protein content material is blended with a food grade emulsifier, lecithin, pregelatinized starch, a gum, and optionally with appearance and texturizing agents (alginates and/or carrageenan) and a neutralizer to form a whole egg replacer base may be used alone or in combination with eggs or egg components as a functional whole egg replacer which is characterized by (1) high protein content substantially the same as eggs, based on Kjeldahl nitrogen tests, (2) low cholesterol and fat content, (3) the combination provides similarity in taste and appearance to eggs, (4) long shelf-life in its dry form, (5) economy, (6) being suspendable in water, (7) being usable in many areas of use to replace a higher proportion of eggs and (8) conforming with all presently known food and dietary laws world-wide.

18 Claims, No Drawings

WHOLE EGG REPLACER

Continuation-in-part of Ser. No. 664,113, March 5, 1976, now abandoned.

BACKGROUND OF THE INVENTION

1. Field of the Invention

The invention relates to the preparation of a high protein whole egg replacer base that may be used either alone or with eggs or their components to form a whole egg replacer.

2. Description of the Prior Art

There are presently known numerous extenders for eggs, egg yolks or egg albumin. These extenders are much more limited in application and in the amount which can be used and have only the advantage of lowering the cost of the eggs used. They have little or no protein content. Therefore, the addition of the extenders reduces substantially the nutritional properties of the end product. In a number of cases, these additives do not provide any egg functionality other than possibly a slight increase in emulsification properties due to the presence of an emulsifier. The extenders also provide some liquid absorption properties. Typical of these materials are gums, starches, mono- and di-sacharides. An egg yolk extender could be used in preparing an extended whole egg. A typical extended egg yolk formulation consists of 80% egg yolk, 18½% corn syrup solids, 1% vegetable gum and ½% lecithin. Basically, this type of extender adds sweeteners and starch to the product while reducing the protein content by one-fifth. The use of the egg yolk extenders has come about mainly because of cost considerations.

It has also been taught in U.S. Pat. No. 1,762,077, issued June 3, 1930 that lecithin emulsified food fat can replace egg yolks. Egg yolks can be extended up to 50% by the use of equal parts of egg yolk and lecithin emulsified with twice the amount of water (1 part lecithin - 2 parts water) as is disclosed in British Pat. No. 392,789, accepted May 25, 1933. Alien Property Custodian, 274,000 to Kramers, published May 4, 1943 discloses an egg substitute of casein, lecithin, fatty oils and optionally, a gum. However, it was found in Germany during World War II, that soy bean lecithin cannot fully replace egg yolk in baked goods (*Kirk-Othmer Encyclopedia of Chemical Technology*, 2nd Edition, 1965, Vol. 12, page 356).

Egg yolks can also be extended for use in some areas by the use of full fat soy flour. The main problem with the use of this material is the inability of the baker to replace the egg yolk in his recipe on an equal weight basis without the necessity of using a new recipe. This material is also unusable as a general egg yolk extender.

Most egg yolk extenders require an adjustment in the final recipe to obtain an equal functional replacement of the egg yolk. The egg yolk extender should also provide the emulsification and water binder characteristics of the egg yolk replaced. If the water binding characteristics are different, the baker's recipe would require variation in the amount of liquid added. Since egg yolk provides various functions, one or more of which may be required in any one recipe, the formulation of an egg yolk extender requires consideration of all the areas in which egg yolks are used and the functions the egg yolk performed in those areas.

Most known egg yolk extenders do not provide the generality of use desirable. The use of some egg yolk extenders is limited to the use for which they were developed. It would be commercially desirable to provide an egg yolk extender which can be used to replace egg yolk on an equal weight and functional basis without the need for modifying the end recipe as to the water content.

These problems have been overcome with a formulated composition of numerous ingredients as disclosed in my previous U.S. Pat. No. 3,864,500, issued Feb. 4, 1975 (Application Ser. No.: 381,416, filed 7/23/73, which was a CIP of Ser. No. 144,328, filed 5/17/71). There is disclosed in this patent the use of a high protein material as the starting material for an egg yolk substitute. The high protein material is prepared in accordance with my U.S. Pat. No. 3,697,290, issued Oct. 10, 1972 (Ser. No. 879,717, filed 11/25/69, which was a CIP of Ser. No. 846,428, filed 7/31/69). The high protein material is prepared by a process including the steps of:

A. simmering a non-elastic protein material such as sesame flour in salted oil;

B. adding a mild acid such as citric acid to bring out flavor;

C. adding water, vegetables, followed by boiling;

D. adding additional water and non-elastic protein material (sesame) and continued boiling; and E. adding a thickening agent, continuing boiling to form the high protein material.

To this high protein material is added a food grade emulsifier; an appearance agent (spice mix) containing coloring agents such as carotene, tumeric and annato; texturizing agents such as alginates or carrageenan; lecithin and a neutralizer such as sodium bicarbonate.

A typical formulation includes:

| High Protein Material | | Egg Yolk Extender | |
|---|---|---|---|
| Vegetable Oil | 8.32% | High Protein Material | 83% |
| Sesame flour | 40.26% | Lecithin | 4.0% |
| Salt | 5.37% | Alginate | 0.5% |
| Citric Acid | .43% | Carrageenan | 0.5% |
| Potato Granules | 4.03% | Emulsifiers | 5.0% |
| Hydrogen Peroxide | — | Sodium Bicarbonate | 2.0% |
| Soya Flour | 16.10 | Spice Mix | 5.0% |
| Corn Meal | 6.71 | | 100.0 |
| Farina | 10.74 | | |
| Propylene Glycol | 6.44 | | |
| Carboxymethyl Cellulose | 1.61 | | |
| | 100.01 | | |

It is taught in my U.S. Pat. No. 3,697,290 that this material will be an effective substitute for egg yolk. The material disclosed in my U.S. Pat. No. 3,864,500 has been found to be less than totally effective in forming a whole egg extender.

THE INVENTION

In accordance with the present invention, it has been found that a whole egg replacer base useful in forming a whole egg replacer can be provided by blending the high protein material disclosed in my U.S. Pat. No. 3,697,290, more fully described hereafter, with lecithin, alginates, carrageenan, food grade emulsifiers, pregelatinized starch, a gum including guar gum, dextrin, and, optionally a neutralizer such as sodium bicarbonate and an appearance agent.

In one form of the present invention, there is added to the egg yolk extender composition of my U.S. Pat. No. 3,864,500, an additional amount of food grade emulsifier, an additional amount of lecithin, pre-gelatinized starch, a gum including guar gum and dextrin, and optionally, an appearance agent.

The composition of the present invention can also be formed by admixing the high protein material of U.S. Pat. No. 3,697,290 which is the base material used in preparing the composition disclosed in U.S. Pat. No. 3,864,500, with an increased amount of lecithin and food grade emulsifiers over that taught as preferred amounts in U.S. Pat. No. 3,864,500, along with a gum including guar gum and dextrin, pregelatinized starch, and, optionally, alginates, carrageenan, a neutralizer and an increased amount of appearance agent over that taught as preferred in U.S. Pat. No. 3,864,500.

In either instance, a composition is provided which is more adapted to preparing a whole egg replacer. The water absorption properties are improved to more fully approximate that of whole egg.

The whole egg replacer can be used on a per weight substitution basis in a broad range of baking applications.

The composition of the present invention also provides a whole egg replacer characterized by a high protein content substantially the same level as eggs, based on Kjeldahl nitrogen tests, low cholesterol and fat content, similarity in taste and appearance to egg yolks, long shelf-life in its dry form and economy.

DETAILED DESCRIPTION OF THE PRESENT INVENTION

The high protein material used in the present invention can be prepared by combining a non-elastic protein material, oil and salt and heating at a low simmering temperature; adding a mild acid to the foregoing and continuing heating for a period of time sufficient to bring out flavor characteristics; adding water and vegetables and boiling; adding additional water and non-elastic protein material and continuing boiling; adding a thickening agent and continuing boiling; and then drying to obtain the high protein content material. The process for preparing this high protein content material is described with more particularity in my patent entitled "High Protein Edible Product and Method of Preparing Same", Ser. No. 879,717, filed Nov. 25, 1969, now U.S. Pat. No. 3,697,290, issued Oct. 10, 1972, and which is incorporated herein by reference. A typical formulation for the high protein material includes a non-elastic protein such as sesame (preferred), soy bean, cotton seed, generally in ground form such as flour; a vegetable oil such as sesame, or cotton seed (preferred) or deodorized soy bean oil; salt; a mild food grade acid for flavor enhancement such as citric (preferred), tartaric, or adipic acid; vegetables such as potatoes (preferred), corn, sugar beets, parsnips, turnips, carrots, parsley, cabbage and the like; non-elastic protein meal such as sesame meal, cotton seed meal or soy bean meal, a thickening agent such as farina (preferred), wheat starch, corn starch or wheat flour; elastic protein such as wheat gluten or substitute therefore such as carboxymethyl cellulose or carrageenan; and a humectant such as propylene glycol or glycerine. In those countries, particularly, outside of the United States of America, which do not allow the use of propylene glycol and carboxymethyl cellulose in foods, the use of carrageenan and glycerine is recommended. An appearance agent to provide a yellow color is added in the form of a spice mix containing, basically, wheat flour as a carrier for carotene, tumeric and annato. This high protein material, in its dried form, is utilized as the basic raw ingredient in the preparation of the compositions of the present invention.

In order to prepare the compositions of the present invention, the high protein material is blended with food grade emulsifiers, lecithin, pregelatinized starch, gums, and optionally, appearance and texturizing agents, to form a whole egg replacer base. Depending on the application, the whole egg replacer base may be used alone or in combination with eggs or their equivalent as a functional whole egg replacer. The whole egg replacer can be combined with egg yolks and egg albumin to provide the whole egg replacer, providing similarity in taste, appearance and functionality to eggs.

Unless otherwise specified, the following definitions apply herein: The term "whole egg replacer base" refers to that material resulting from the addition of food grade emulsifiers, lecithin, starches, gums, optionally, appearance and texturizing agents to the high protein content material as described in the U.S. Pat. No. of Lynn, 3,679,290. The whole egg replacer base is combined with eggs or their components, and optionally, corn syrup solids, and dextrin as a functional whole egg replacer. Accordingly, unless otherwise specified, the term "whole egg replacer", as used herein, comprises the combination of the whole egg replacer base, eggs or their equivalent, and optionally, corn syrup solids and dextrin. Finally, the term "whole eggs and their components" denotes liquid whole egg and dried whole egg (whole eggs), combinations of liquid or dried egg yolk with liquid or dried egg white or albumen (whole egg components).

As desired, and depending upon the product, dried whole eggs, dried egg albumen, dried egg yolks, liquid whole eggs, liquid egg yolks, liquid egg whites or combinations thereof may be used with whole egg replacer base of this invention to form the whole egg replacer.

The whole egg replacer may be used as a complete or partial replacement for eggs in baked yeast raised cakes such as Danish, coffee cake and doughnuts. The eggs required in dried food pastas such as noodles, macaroni, spaghetti, and the like, may be wholely replaced with the whole egg replacer. In cookies, specialty breads made with eggs, and high ratio cakes such as layer and pound cakes, the eggs can be replaced totally with the whole egg replacer. These are but a few of the uses for the whole egg replacer of the present invention.

Other advantages of the whole egg replacer of the present invention include improved water absorption more nearly approximating natural egg, ability to use the composition of the present invention on a pound for pound replacement basis for dried whole egg, conformity with world-wide food and dietary laws, and its long shelf-life since it does not degrade due to oxidation at the same high rate as eggs. The whole egg replacer can be used in replacing the egg ingredient for high ratio cakes, such as a layer or pound. The housewife using a cake mix containing the whole egg replacer, depending on the formulation, can either omit adding other eggs completely when she mixes the milk or water with the dry cake mix or add only one whole egg. Further, other dry mixes, such as coffee cakes, etc. for the commercial market or the housewife, containing the whole egg replacer are possible.

All percentages given herein are by weight unless otherwise noted.

DESCRIPTION OF THE PREFERRED EMBODIMENTS

In accordance with the teachings of the present invention one first forms a high protein material as set forth in my U.S. Pat. No. 3,697,290 entitled, "High Protein Edible Products and Method of Preparing Same". In the first step, a non-elastic protein material, oil and salt are combined and heated at a low simmering temperature. Typically, 75 lbs. of sesame flour (approximately 50% protein) are combined with ten gallons of vegetable oil made from sesame and 50 pounds of salt and simmered at 180° to 190° F. for approximately 40 to 50 minutes.

Then, additional non-elastic protein material and a mild acid are added to the foregoing and the heating continued to bring out flavor characteristics. Typically 50 pounds of sesame flour and 4 pounds of citric acid are added until the temperature 190° F. is reached and heating continues for thirty minutes at a temperature of 190° to 200° F.

In the next step of the operation, water, vegetables and hydrogen peroxide are added. Typically, 120 gallons of cold water, 40 pounds of potato flour and 12 pounds of 35% hydrogen peroxide in water solution are added, the combination is brought to a boil and boiling is continued for approximately ten minutes.

After boiling the foregoing combination, additional water and non-elastic protein material are added and the entire mass is brought back to boiling and boiling is continued. Typically, 120 gallons of water are added and the combination is brought back to the boiling point. Then 120 pounds of sesame flour, 60 pounds of corn meal and 150 pounds of soybean flour are added. Boiling continues for another 25 minutes.

At this point a thickening agent is added and cooking is continued. Typically 100 pounds of farina is added while boiling is continued and the heating is then discontinued.

To inhibit the propagation of mold, a suitable, acceptable amount of inhibitor conforming with the Food and Drug Administration Regulations can be added. Typically one pound of potassium sorbate in warm water is added and mixed well. After the cooking stage the material is dried and the formation of the high protein content material is to be used immediately after the cooking stage to form a whole egg replacer base, the drying step may be omitted.

The percentage of ingredients forming the high protein material may be varied over a wide range so long as the product achieves a protein content of between 25 and 55%, a fat content of between 5 and 15% and a carbohydrate content of between 25 to 50%.

In accordance with the teachings of the present invention, this high protein material is mixed with food grade emulsifiers. The emulsifiers provide a product having the swelling and absorption properties similar to whole eggs and are necessary in the formation of the cell structure in the products in which the egg replacer substitute is to be used.

The emulsifiers, typically, mono- and diglyceride, hydrated mono- and diglyceride, distilled monoglycerides, sorbitan monostearate, dioctyl sodium sulfosuccinate, polyoxyethylene sorbitan fatty acid esters such as polysorbate 60, etc. and mixtures thereof, serve the purpose of binding the oil and water systems in the blend and add aeration qualities to the egg yolk substitute.

While the previously listed emulsifiers are preferred, a wide range of food grade emulsifiers can be used, such as those listed under "Emulsifiers: Whipping and Foaming Agents" on page 1013 of a book entitled *Food Chemicals Codex*, Second Edition, published by National Academy of Sciences, Washington, D.C. 1972. That list of emulsifiers is incorporated herein by reference.

Lecithin, a well known article of commerce, is also included in the composition of the present invention. It comprises a group of phosphatides which are mixtures of the diglyceride residues of stearic, palmitic and oleic acids linked to the choline ester of phosphoric acid. The material in its pure form is generally available as a viscous, tacky fluid.

Lecithin is obtained from various source materials. While all these lecithins can be used, the preferred source of lecithin is the lecithin of commerce, soy bean lecithin.

Since lecithin is a viscous tacky fluid, it is usually heated to a temperature within the range of from about 40°-60° C. to increase the fluidity when mixing.

The food grade emulsifier can be blended with all of the ingredients in an amount sufficient to provide from about 2 to about 12% by weight based on the total weight of the whole egg replacer base. The preferred amount of emulsifier is from about 5 to about 7%.

Also, a portion of the emulsifier can be blended with the high protein material to provide the material claimed in U.S. Pat. No. 3,864,500. The composition of the present invention requires an additional amount of emulsifier be added over and above that used in preparing the composition in U.S. Pat. No. 3,864,500 in the range of from about 2 to about 7% by weight based on the total weight of the whole egg replacer base, the total percentage not exceeding 12%.

Either one of these methods of blending the emulsifier can be used as they are equally effective. The percentages can be satisfied with mixtures of emulsifiers. All emulsifiers percentages are based on active ingredient content of the emulsifier composition.

The lecithin is used in an amount ranging from about 2 to about 12% and preferably from about 5 to about 10% by weight based on the total weight of the whole egg replacer base. A portion of the lecithin can also be added as a constituent of the composition of U.S. Pat. No. 3,864,500. Additional lecithin within the range of from about 2 to about 8% over and above that amount present in the composition of U.S. Pat. No. 3,864,500 can be added the total percentage of lecithin not to exceed 12%, and preferably 10%.

A spice mix is added as an appearance agent and typically includes a wheat flour which acts as a carrier for other ingredients and spices typically carroteen, tumeric and annato which are included principally as appearance agents. Typically, the spice mix formulation is 60% wheat flour and 40% spices, but these percentages are variable, depending upon the coloring desired. An operable range for the spice mix is from 0% up to 15% by weight of the whole egg replacer base, and a preferred range for a whole egg replacer (total) being from 8 to 10%. A portion of the spice mix, i.e., from about 5 to about 7%, can be included as part of the composition of U.S. Pat. No. 3,864,500, the total amount of spice mix in the final product not to exceed 15%.

The texturizing agent normally includes a seaweed extract, for example, alginate and carrageenan or carboxymethyl cellulose or a gum such as guar gum. They are included to aid emulsification, texture and moisture absorption in the final use area. Carrageenan is preferred over carboxymethyl cellulose as it is accepted as usable in foods in those areas where carboxymethyl cellulose is not. The viscosity in the final use area such as a cake batter can be varied by varying the percentage of texturizing agent present. An operable range of the texturizing agent is up to 4% by weight of the whole egg replacer base formulation with the optimum being about 3%. In the preferred embodiment, 0.85% of sodium alginate, 0.85% of carrageenan and 1.1% guar are included in the final whole egg replacer base formulation. It is also preferred that the final whole egg replacer base contain at least from about 0.75 to 1.5% by weight guar gum.

Frequently, the whole egg replacer of the present invention will be used in making cakes and the like which employ chemical leavening acids. When such leavening acids are to be employed it will be necessary to counter balance the acids in the substitute. Accordingly, a neutralizer, under these circumstances, is normally included in the whole egg replacer formulation. An operable range is up to about 2 to about 5%, a preferred range being from about 1 to 4%, by weight based on the total weight of the whole egg replacer base. Bicarbonate of soda is the neutralizer most commonly employed. A neutralizer may also be included in the whole egg replacer even for use in products which do not employ chemical leavening acids and without consequence.

Also included in the composition of the present invention is dextrin, also known as starch or vegetable gum. It is an intermediate product formed by the hydrolysis of starches. Industrially, it is prepared by treating starch with dilute acid or by heating dry starch. The dextrin can be added to the product of U.S. Pat. No. 3,864,500 in amounts from about 2 to 12% by weight based on the total weight of the whole egg replacer base. The dextrin is preferably used in amounts ranging from about 5 to about 11% and preferably from about 7 to 10%.

Dextrin can optionally be added to the final whole egg replacer in amounts ranging from about 0 to 16% by weight. For dry whole egg replacers, dextrin is generally used in an amount ranging from about 5 to 16% and preferably from about 7 to about 11%. For liquid whole egg replacers, dextrin is generally used in an amount ranging from about 1 to about 5%.

The dextrin can be added by blending the same with the product of U.S. Pat. No. 3,864,500. The composition of the invention can also be prepared by combining the necessary ingredients in a continuous process. The amount of dextrin which, can optionally, be added to the whole egg replacer base in combination with the eggs can be added in with the previously discussed first amount of dextrin.

The composition of the present invention also contains pregelatinized starch. This product is a pregelled starch generally prepared by heating a starch solution to about its gelatinization point (50°–70° C.) and drying, i.e., spray drying. Pregelatinized starch is a commercially available product which is used in an amount ranging from about 4 to 12% and preferably from about 5 to 11%. The pregelatinized starch can be blended with the product of U.S. Pat. No. 3,864,500 or blended with the other ingredients in initially manufacturing the whole egg replacer base. The high protein material comprises from about 40 to about 95% of the final whole egg replacer base.

The whole egg replacer base of the present invention can be combined with liquid whole eggs, liquid egg white, liquid egg yolk, dried whole eggs, dried albumen, dried egg yolks, and optionally dextrin and water to form a whole egg replacer. The whole egg replacer can be liquid or dry. The blending of the whole egg replacer base and the egg components can be accomplished before use or during use. Thus, a product containing the whole egg replacer base and egg components can be blended and sold to the user. Alternatively, the whole egg replacer base can be sold to the user who adds the base and the requisite amount of egg components during use such as in a cake batter. Any combination of egg components which can be fresh, dried, or frozen can be used to provide the egg yolk and egg whole components. In case of the dry whole egg replacer, the whole egg replacer base is used in an amount ranging from about 25 to 60%, preferably from about 30% to 50%, the dry whole eggs in an amount ranging from about 25% to about 60% and preferably from about 30% to 55%, dried albumen or dried egg white in an amount ranging from about 10% to 20% and preferably from about 11 to 17%. Dextrin can optionally be added as previously discussed.

In the case of liquid whole egg replacers, the whole egg replacer base can be used in an amount of from 5 to 45% by weight, preferably from about 9% to 37%, liquid whole egg in an amount ranging from about 30 to about 60%, preferably from about 35 to 55%, liquid egg white in an amount ranging from about 30% to about 40% and optionally, water in an amount ranging from about 0–50% preferably from about 15 to 50% and dextrin in an amount ranging from about 1% to about 4% and preferably about 2%. Dry egg or egg components reconstituted either prior to blending or during blending can be used in place of liquid egg or egg components. In general, a whole egg replacer composition of the present invention can be prepared by blending from about 5 to about 45% by weight of the whole egg replacer base with eggs or egg components in an amount ranging from about 95% to about 55%. Optionally, water in the amount of 15% to 50% and dextrin in an amount of from 1% to 4% can be used.

In food products calling for egg yolks, the whole egg replacer base resulting from the preceding description may be used either alone or with egg yolks, depending on the application to replace egg yolks. While for some applications the whole egg replacer base may be used alone, better results are achieved when mixed with egg yolks because of an apparent reaction which takes place between egg yolks and the whole egg replacer base such that the taste, texture, appearance and functional properties of the resulting combination more closely match those of egg yolks and over a wide range of applications.

My invention may also be used to obtain the equivalent of whole eggs in such items as pound cakes, layer cakes, etc. Egg albumen and preferably, whole egg powder can be added to obtain a whole egg replacer. Typical weight ratios are 45% whole egg replacer base, 20% albumen, balance whole egg powder.

Whole egg replacer compositions which are accepted as satisfying dietary laws (Kosher) and conforming to world-wide food laws can also be prepared. Typical formulations include 40–60% of the high protein content material, 3–6% food grade emulsifier, 3–7% lecithin, 25-35% dextrin and optionally 1-2% neutralizer and 5-15% appearance agent. The composition can be blended with approximately equal parts of dry yolk and optionally, 5-15% dextrin. The whole egg replacers of the present invention should not be used in recipes which contain milk replacers as the quality of baked goods so produced has been found to be less than the quality of baked goods when either is used alone.

The following examples are included merely to aid in the understanding of the invention, and variations may be made by one skilled in the art without departing from the spirit and scope of the invention.

EXAMPLE 1

Part A

A high protein material was prepared for use as a base for preparing compositions of the present invention using the process as outlined hereinbefore and as set forth in U.S. Pat. No. 3,697,290, by combining the following materials in accord with that process:

|  | Kilograms | % By Weight Final Product |
|---|---|---|
| Vegetable Oil | 57.85 | 8.32 |
| Sesame Seed Flour | 279.93 | 40.26 |
| Salt | 37.32 | 5.37 |
| Citric Acid | 2.98 | 0.43 % |
| Potato Granules | 27.99 | 4.03 % |
| Hydrogen Peroxide | 9.33 | No Weight Contribution |
| Soya Flour | 111.97 | 16.10 |
| Corn Meal | 46.66 | 6.71 |
| Farina | 74.65 | 10.74 |
| Propylene Glycol | 44.79 | 6.44 |
| Carboxymethyl Cellulose | 11.2 | 1.61 |

Part B

To this material was added the following ingredients:

| | |
|---|---|
| High Protein Material of Part A | 83% |
| Lecithin | 4% |
| Sodium Alginate | 0.5% |
| Potassium Carrageenan | 0.5% |
| Emulsifier D-7 (Contains Polysorbate) | 5.0% |
| Sodium Bicarbonate | 2.0% |
| Spice Mix | 5.0% |
| Product of Part B | 100.0 |

This product of Part B was dried before further use. This material was used in preparing the composition of the present invention.

EXAMPLES 2-35

The compositions of the present invention were prepared by admixing the product of Example 1 with other ingredients to be listed hereinafter. In Part I, and generally, the emulsifiers and the lecithin are premixed at elevated temperature (90° to 140° C.). The premix is then added to a blend of the remaining dry ingredients. The product is usually ground to maintain uniform particle size. This material of Part I is a base from which the whole egg replacers of the present invention are prepared.

In Part II, the composition of Part I is blended with egg solids, gums, water and the like to form the whole egg replacer of the present invention. The information on ingredients and amounts in percent by weight for Parts I and II is given in Table I. Any change in formulation is indicated by a footnote reference.

TABLE I

| EXAMPLE NO: | 2 | 3 | 4 | 5 | 6 | 7 |
|---|---|---|---|---|---|---|
| Part I | | | | | | |
| Product of Example 1 | 70.83 | 70.83 | 70.83 | 70.83 | 70.83 | 71 |
| Emulsifiers[1] | 4.17 | 4.17 | 4.17 | 4.17 | 4.17 | 4 |
| Lecithin Concentrate | 3.13 | 3.13 | 3.13 | 3.13 | 3.13 | 3 |
| Pregelatinized Starch | 7.29 | 7.29 | 7.29 | 7.29 | 7.29 | 9 |
| Guar Gum | 1.04 | 1.04 | 1.04 | 1.04 | 1.04 | 1 |
| Dextrin | 9.37 | 9.37 | 9.37 | 9.37 | 9.37 | 8 |
| Algin | — | — | — | — | — | — |
| Potassium Carrageenan | — | — | — | — | — | — |
| Sodium Bicarbonate | — | — | — | — | — | — |
| Spice Mix | 4.17 | 4.17 | 4.17 | 4.17 | 4.17 | 4 |
| Mixing Temperature (Lecithin) | 23-29° C. | | | | | |
| Part II | | | | | | |
| Product Part I (above) | 48 | 13 | 13 | 13 | 10 | 36 |
| Water | — | 46 | 18 | 18 | 20 | — |
| Dry Whole Egg | 36 | — | — | — | — | 40 |
| Liquid Whole Egg | — | 36.5 | 37 | 37[B] | 40 | — |
| Liquid Egg White | — | — | 32 | 32 | 30 | — |
| Dry Yolk | — | — | — | — | — | — |
| Dry Albumen | 16 | 4.5 | — | — | — | 15 |
| Dextrin | — | — | — | — | — | 9 |

[1] Atlas G-2462 - A combination of hydrated mono- and diglycerides, polysorbate 60 and sorbitan monostearate.
[B] Thawed frozen egg.

| EXAMPLE NO: | 8 | 9 | 10 | 11 | 12 | 13[D] |
|---|---|---|---|---|---|---|
| Part I | | | | | | |
| Product of Example 1 | 71 | 71 | 71 | 71 | 71 | 71 |
| Emulsifiers[1] | 4 | 4 | 4 | 4 | 4 | 4.5 |
| Lecithin Concentrate | 3 | 3[C] | 3[C] | 3[C] | 3 | 3.25 |
| Pregelatinized Starch | 9 | 9 | 9 | 9 | 9 | 8.4 |
| Guar Gum | 1 | 1 | 1 | 1 | 1 | 1.1 |
| Dextrin | 8 | 8 | 8 | 8 | 8 | 5 |
| Algin | — | — | — | — | — | — |
| Potassium Carrageenan | — | — | — | — | — | — |
| Sodium Bicarbonate | — | — | — | — | — | — |
| Spice Mix | 4 | 4 | 4 | 4 | 4 | 3.5 |
| Mixing Temperature (Lecithin) | | | | | 38° C. | |
| Part II | | | | | | |
| Product Part I (above) | 10 | 32 | 10 | 10 | 37 | 36 |
| Water | 20 | — | 20 | 18 | — | — |
| Dry Whole Egg | — | 40 | — | — | 40 | 40 |
| Liquid Whole Egg | 40 | — | 40 | 40 | — | — |

TABLE I-continued

| | | | | | | |
|---|---|---|---|---|---|---|
| Liquid Egg White | 30 | — | 30 | 30 | — | — |
| Dry Yolk | — | — | — | — | — | — |
| Dry Albumen | — | 15 | — | — | 15 | 15 |
| Dextrin | — | 8 | — | 2 | 8 | 9 |

* Hydroxylated Lecithin.
* Shortening in amount of 3.5% added to Part I.

| EXAMPLE NO: | 14[D] | 15 | 16 | 17 | 18[F] | 19[F] |
|---|---|---|---|---|---|---|
| Part I | | | | | | |
| Product of Example 1 | 71 | 71 | 71 | 71 | 71 | 71 |
| Emulsifiers[.1] | 4.25 | 4.2 | 4.2 | 4 | 4 | 4 |
| Lecithin Concentrate | 3.25[E] | 3.2 | 3.2 | 3 | 3 | 3 |
| Pregelatinized Starch | 8.4 | 8 | 8 | 9 | 9 | 9 |
| Guar Gum | 1.1 | 1.1 | 1.1 | 1 | 1 | 1 |
| Dextrin | 5 | 9 | 9 | 8 | 8 | 8 |
| Algin | — | — | — | — | — | — |
| Potassium Carrageenan | — | — | — | — | — | — |
| Sodium Bicarbonate | — | — | — | — | — | — |
| Spice Mix | 3.5 | 3.5 | 3.5 | 4 | 4 | 4 |
| Mixing Temperature (Lecithin) | | 32° C. | 32° C. | | | |
| Part II | | | | | | |
| Product Part I (above) | 36 | 36 | 10 | 60 | 35 | 10 |
| Water | — | — | 20 | — | — | 44 |
| Dry Whole Egg | 40 | 40 | — | — | — | — |
| Liquid Whole Egg | — | — | 40 | — | — | 40 |
| Liquid Egg White | — | — | 30 | — | — | — |
| Dry Yolk | — | — | — | — | 35 | — |
| Dry Albumen | 15 | 15 | — | 25 | — | — |
| Dextrin | 9 | 9 | — | 15 | 5 | 2 |

* Alternate Source of lecithin.
* Flour added Part II, 25% in Example 18 and 4% in Example 19.

| EXAMPLE NO: | 20 | 21 | 22 | 23 | 24 | 25 |
|---|---|---|---|---|---|---|
| Part I | | | | | | |
| Product of Example 1 | 71 | 71 | 60[G] | 60[G] | 60[G] | 60[G] |
| Emulsifiers[.1] | 4 | 4 | 6[N] | 3[N] | 2.75[I] + 2.75[J] | 3[J] |
| Lecithin Concentrate | 3 | 3 | 4 | 6 | 5.5 | 6 |
| Pregelatinized Starch | 9 | 9 | 8 | 8 | 8 | 8 |
| Guar Gum | 1 | 1 | 1.1 | 1.1 | 1.1 | 1.1 |
| Dextrin | 8 | 8 | 10 | 10 | 8 | 10 |
| Algin | — | — | .4 | .35 | .35 | .35 |
| Potassium Carrageenan | — | — | .4 | .35 | .35 | .35 |
| Sodium Bicarbonate | — | — | 1.4 | 2 | 2 | 1.9 |
| Spice Mix | 4 | 4 | 8.7 | 9.2 | 9 | 9 |
| Mixing Temperature (Lecithin) | | | 48.9° C. | | | |
| Part II | | | | | | |
| Product Part I (above) | 26 | 40 | 45 | 45 | 45 | 45 |
| Water | 44 | — | — | — | — | — |
| Dry Whole Egg | — | — | 40 | 40 | 40 | 40 |
| Liquid Whole Egg | 40 | — | — | — | — | — |
| Liquid Egg White | — | — | — | — | — | — |
| Dry Yolk | — | 50 | — | — | — | — |
| Dry Albumen | — | — | 15 | 15 | 15 | 15 |
| Dextrin | — | 10 | — | — | — | — |

* Product Example 1, Part A
* Atmul 84 - Mono- and diglyceride Emulsifier.
* Myverol 18-40
* Myverol 18-85
* Addition of 1% glycerin to Part I
* Myverol 10-50 K
* Myverol 18-50 K
* Product of Example 1, Part A having the following composition: sesame flour (42.3), soya four (16.92), farina (11.28), vegetable oil (8.75), corn meal (7.05), salt (5.64), potato four (4.23), glycerin (2.82), carrageenan (0.56), Citric acid (0.45).
* 2% spice mix added to Part II.

| EXAMPLE NO: | 26 | 27 | 28[K] | 29[K] | 30 | 31 |
|---|---|---|---|---|---|---|
| Part I | | | | | | |
| Product of Example 1 | 60[G] | 60[G] | 50[G] | 50[G] | 60[G] | 60[N] |
| Emulsifiers[.1] | 2.2[J] + 2[N] | 4[M] | 2.5[L] | 2.5[L] | 3[L] | 3[M] |
| Lecithin Concentrate | 6.2 | 6 | 5 | 5 | 6 | 6 |
| Pregelatinized Starch | 8 | 8 | — | — | 8 | 8 |
| Guar Gum | 1.1 | 1.1 | — | — | 1.1 | 1.1 |
| Dextrin | 9 | 9 | 30 | 30 | 10 | 10 |
| Algin | .35 | .35 | — | — | .35 | .35 |
| Potassium Carrageenan | .35 | .35 | — | — | .35 | .35 |
| Sodium Bicarbonate | 1.8 | 1.9 | 1.5 | 1.5 | 2 | 2 |
| Spice Mix | 9 | 9.3 | 10 | 10 | 9.2 | 9.2 |
| Mixing Temperature (Lecithin) | | | | | | |
| Part II | | | | | | |
| Product Part I (above) | 45 | 45 | 50 | 38 | 45 | 45 |
| Water | — | — | — | — | — | — |
| Dry Whole Egg | 40 | 40 | — | — | 40 | 40 |
| Liquid Whole Egg | — | — | — | — | — | — |
| Liquid Egg White | — | — | — | — | — | — |
| Dry Yolk | — | — | 50 | 50 | — | — |
| Dry Albumen | 15 | 15 | — | — | 15 | 15 |
| Dextrin | — | — | — | 10 | — | — |

| EXAMPLE NO: | 32 | 33 | 34 | 35 |
|---|---|---|---|---|
| Part I | | | | |
| Product of Example 1 | 60[G] | 60[N] | 60[N] | 60[N] |
| Emulsifiers[.1] | 3[L] | 3[M] | 3[M] | 3[M] |

TABLE I-continued

| | | | | |
|---|---|---|---|---|
| Lecithin Concentrate | 6 | 6 | 6 | 6 |
| Pregelatinized Starch | 8 | 8 | 8 | 8 |
| Guar Gum | 1.1 | 1.1 | 1.1 | 1.1 |
| Dextrin | 10 | 10 | 10 | 10 |
| Algin | .35 | .35 | .35 | .35 |
| Potassium Carrageenan | .35 | .35 | .35 | .35 |
| Sodium Bicarbonate | 2 | 2 | 2 | 2 |
| Spice Mix | 9.2 | 9.2 | 9.2 | 9.2 |
| Mixing Temperature (Lecithin) | | | | |
| Part II | | | | |
| Product Part I (above) | 12.5 | — | 35 | 30 |
| Water | — | — | — | — |
| Dry Whole Egg | — | — | 50 | 50 |
| Liquid Whole Egg | 50 | — | — | — |
| Liquid Egg White | 37.5 | — | — | — |
| Dry Yolk | — | — | — | — |
| Dry Albumen | — | — | 15 | 12.7 |
| Dextrin | — | — | — | 7.5 |

EXAMPLES 36-75

The whole egg substitutes of the present invention were evaluated in yellow layer cakes. The yellow layer cakes were prepared by blending the following ingredients:

| | |
|---|---|
| Base cake mix (see below) | 690 grams |
| Shortening | 108 grams |
| Emulsifier (Atmul 80) | 12 grams |
| Whole Egg Replacement of Present Invention | See Table |
| 1st Stage water (if liquid egg substitute used). | 50 cc. |
| 1st Stage water (if dry egg substitute is used) | 180 cc. |
| 2nd Stage water | 180 cc. |
| Base Cake Mix: | |
|     Sugar | 345 grams |
|     Cake Flour | 300 grams |
|     Salt | 6 grams |
|     Baking Powder | 15 grams |
|     Non-fat Dried Milk | 24 grams |

The dry ingredients were blended along with the whole egg replacer. The emulsifier and shortening were then added along with the 1st stage water. The ingredients were then blended according to mixing schedule given in Table II. The second stage water was added where indicated in amounts of 90 cc. The mixing bowl was scraped down several times during mixing. The specific gravity of the batter was then determined, 0.85-0.90 preferred. The batter was baked into cakes at 166.7° C. for 32 minutes. The cake was weighed and its volume determined. The results are reported in Table II.

TABLE II

| EXAMPLE NO: | 36 | 37 | 38 | 39 | 40 |
|---|---|---|---|---|---|
| Yellow Layer Cake | | | | | |
| Product of Example | 5 | 5 | 6 | 3 | 3 |
| Amount in Grams | 180 | 180 | 180 | 50 | 50 |
| Water (amount in cc.) | 50 | 50 | 50 | 180 | 180 |
| Mixing Schedule | 1 | 3 | 2 | 2 | 2 |
| Specific Gravity (Batter) | .87 | .88 | .87 | .88 | .88 |
| Temperature of Specific Gravity Mass in ° C. | 22.8 | 21.1 | 20 | 21.1 | 21.1 |
| Weight of cake (grams) | 345 | 354 | 337 | 363 | 375 |
| Volume of Cake (cc) | 1155 | 1180 | 1180 | 1160 | 1230 |
| Specific volume of cake | 3.35 | 3.33 | 3.50 | 3.20 | 3.2% |
| Remarks | Exc. | Exc. | Exc. | Exc. | — |

Mixing Schedule (minutes/speed):
1 1/slow, 3/medium; *1/slow 3/medium; *2/slow
2 1/slow, 2½medium; *1/slow, 2½/medium; **2/slow
3 1/slow, 3 medium; *1/slow, 2½/medium; **2/slow
4 1/slow, 2½/medium; *1/slow, 3/medium; **2/slow
5 2/medium; *2/medium; **1/slow
6 1/slow, 3½/medium; *1/slow, 3½/medium; **2/slow
7 3/medium; add 90 cc. water; 3/medium; add 90 cc. water; 2/slow.
*add 90 cc. water;
**add 90 cc. water.

| EXAMPLE NO: | 41 | 42 | 43 | 44 | 45 |
|---|---|---|---|---|---|
| Yellow Layer Cake | | | | | |
| Product of Example | 12 | 13 | 14 | 16[d] | 22 |
| Amount in Grams | 50 | 50 | 50 | 180 | 48 |
| Water (amount in cc.) | 180 | 180 | 180 | 50 | 180 |
| Mixing Schedule | 2 | 2 | 2 | 2 | 2 |
| Specific Gravity (Batter) | .87 | .86 | .87 | .85 | .89 |
| Temperature of Specific Gravity Mass in ° C. | 22.2 | 21.1 | 21.1 | 20.6 | 19.4 |
| Weight of cake (grams) | 363 | 364 | 369 | 366 | 389 |
| Volume of Cake (cc) | 1220 | 1310 | 1310 | 1300 | 1190 |
| Specific volume of cake | 3.36 | 3.60 | 3.55 | 3.55 | 3.31 |
| Remarks | — | — | — | Exc. | — |

Prepared on commercial equipment, pasteurized and blast frozen.

| EXAMPLE NO: | 46 | 47 | 48 | 49 | 50 |
|---|---|---|---|---|---|
| Yellow Layer Cake | | | | | |
| Product of Example | 23 | 24 | 25 | 26 | B |
| Amount in Grams | 48 | 48 | 48 | 48 | 48 |
| Water (amount in cc.) | 180 | 180 | 180 | 180 | 180 |
| Mixing Schedule | 4 | 1 | 1 | 1 | 1 |
| Specific Gravity (Batter) | .95 | .92 | .95 | .95 | .90 |
| Temperature of Specific Gravity Mass in ° C. | 21.1 | 20 | 21.1 | 21.1 | 21.1 |
| Weight of cake (grams) | 340 | 338 | 340 | 343 | 343 |

TABLE II-continued

| | | | | | |
|---|---|---|---|---|---|
| Volume of Cake (cc) | 1105 | 1130 | 1090 | 1085 | 1135 |
| Specific volume of cake | 3.25 | 3.34 | 3.21 | 3.16 | 3.31 |
| Remarks | — | — | — | — | CONTROL |

Dried Whole Eggs

| EXAMPLE NO: | 51 | 52 | 53 | 54 | 55 |
|---|---|---|---|---|---|
| Yellow Layer Cake | | | | | |
| Product of Example | 27 | 22 | 23 | 24 | 25 |
| Amount in Grams | 48 | 48 | 48 | 48 | 48 |
| Water (amount in cc.) | 180 | 180 | 180 | 180 | 180 |
| Mixing Schedule | 1 | 1 | 1 | 1 | 1 |
| Specific Gravity (Batter) | .95 | .93 | .94 | .96 | .93 |
| Temperaure of Specific Gravity Mass in ° C. | 21.1 | 20.6 | 21.7 | 22.2 | 21.1 |
| Weight of cake (grams) | 343 | 341 | 341 | 341 | 347 |
| Volume of Cake (cc) | 1080 | 1110 | 1140 | 1065 | 1105 |
| Specific volume of cake | 3.15 | 3.25 | 3.34 | 3.12 | 3.18 |
| Remarks | | | | Split | |

| EXAMPLE NO: | 56 | 57 | 58 | 59 | 60 |
|---|---|---|---|---|---|
| Yellow Layer Cake | | | | | |
| Product of Example | 26 | 27 | 23$^C$ | 23$^D$ | 16$^J$ |
| Amount in Grams | 48 | 48 | 48 | 48 | 48 |
| Water (amount in cc.) | 180 | 180 | 180 | 180 | 180 |
| Mixing Schedule | 1 | 1 | 1 | 5 | 1 |
| Specific Gravity (Batter) | .93 | .92 | .84 | .79 | .64 |
| Temperature of Specific Gravity Mass in ° C. | 21.1 | 20.6 | 19.4 | 20.6 | 20.6 |
| Weight of cake (grams) | 344 | 344 | 338 | 342 | 344 |
| Volume of Cake (cc) | 1090 | 1100 | 1050 | 1120 | 1050 |
| Specific volume of cake | 3.17 | 3.20 | 3.11 | 3.27 | 3.05 |
| Remarks | | | Coarse low volume | Weak Structure | |

Used Carlton 1100 emulsifier in place of Atmul-80
Used G-2462 Emulsifier in place of Atmul-80 Shortening increased to 110.5 and Emulsifier level reduced to 9.5
Product of Ex. 1, Part 1, ground prior to further processing
Ingredients added separately to cake mix and not preblended.

| EXAMPLE NO: | 61 | 62 | 63 | 64 | 65 |
|---|---|---|---|---|---|
| Yellow Layer Cake | | | | | |
| Product of Example | 31 | Control | 31$^E$ | 31 | 30 |
| Amount in Grams | 48 | 48 | 48 | 48 | 48 |
| Water (amount in cc.) | 180 | 180 | 180 | 180 | 180 |
| Mixing Schedule | 6 | 6 | 6 | 6 | 6 |
| Specific Gravity (Batter) | .94 | .93 | .96 | .97 | .96 |
| Temperature of Specific Gravity Mass in ° C. | 21.1 | 22.8 | 22.2 | 22.8 | 22.8 |
| Weight of cake (grams) | 341 | 343 | 341 | 341 | 343 |
| Volume of Cake (cc) | 1090 | 1185 | 1110 | 1095 | 1120 |
| Specific volume of cake | 3.20 | 3.45 | 3.25 | 3.21 | 3.26 |
| Remarks | Low volume | | Finer grain than following example | | |

| EXAMPLE NO: | 66 | 67 | 68 | 69 | 70 |
|---|---|---|---|---|---|
| Yellow Layer Cake | | | | | |
| Procuct of Example | $^B$ | 33 | 32 | 32 | 31 |
| Amount in Grams | 48 | 48 | 50 | 144 | 50 |
| Water (amount in cc.) | 180 | 180 | 180 | 85 | 180 |
| Mixing Schedule | 1 | 1 | 1 | 1 | 1 |
| Specific Gravity (Batter) | .92 | .97 | .97 | .95 | .97 |
| Temperature of Specific Gravity Mass in ° C. | 21.7 | 21.7 | 21.1 | 21.1 | 21.7 |
| Weight of cake (grams) | 340 | 337 | 337 | 341 | 337 |
| Volume of Cake (cc) | 1150 | 1080 | 1050 | 1100 | 1050 |
| Specific volume of cake | 3.38 | 3.20 | 3.12 | 3.23 | 3.12 |
| Remarks | | | | | |

| EXAMPLE NO: | 71 | 72 | 73 | 74 | 75 |
|---|---|---|---|---|---|
| Yellow Layer Cake | | | | | |
| Product of Example | 32 | 30 | 30 | 30 | 30 |
| Amount in Grams | 144$^F$ | 48 | 48 | 48 | 48 |
| Water (amount in cc.) | 50 | 180 | 180 | 180 | 180 |
| Mixing Schedule | 1 | 1 | 1 | 1 | 7 |
| Specific Gravity (Batter) | .87 | .87 | .91 | .96 | .92 |
| Temperature of Specific Gravity Mass in ° C. | 20 | 20.6 | 21.1 | 20.6 | 19.4 |
| Weight of cake (grams) | 340 | 337 | 345 | 341 | 344 |
| Volume of Cake (cc) | 1120 | 1090 | 1150 | 1140 | 1125 |
| Specific volume of cake | 3.29 | 3.23 | 3.33 | 3.34 | 3.27 |
| Remarks | | No difference whether ingredients of product of Example 31 are preblended or blended with cake ingredients | Uses 10.8 g. Atmul-80 and 1.2 g. 2462 | Uses 12 g. Atmul-80 | |

EXAMPLES 76-107

The whole egg substitutes of the present invention were evaluated in a sponge cake. The cake batter was prepared from the following ingredients:

| | |
|---|---|
| Base Mix (see below) | 750 grams |
| Water (1st stage) | See Table III |
| Whole egg substitute of present invention | See Table III |
| Emulsifier | See Table III |
| Water Second Stage | 150 cc. |
| Base Mix Preparation | |
| Cake flour | 42.8% |
| Sugar | 51.4% |
| Non-fat dried milk | 3.2% |
| Salt | 1.3% |
| Baking Powder | 1.2% |

The dry ingredients were blended in a Hobart Model C-100 with a 3 quart bowl and wire whip with the emulsifier and the 1st stage water. The mixing schedule is set forth in Table III. The bowl was scraped down several times during the mixing. After mixing the specific gravity of the batter was measured. Preferred specific gravity 0.51-0.525. 283 grams of batter was then scaled into 6½ inches (165 mm) ungreased tube pans and baked at 190.6° C. for 30 minutes. The weight and volume of the cake were determined. The results are reported in Table III. The amount of emulsifier is in grams.

TABLE III

| EXAMPLE NO. | 76 | 77 | 78 | 79 | 80 | 81 | 82 |
|---|---|---|---|---|---|---|---|
| Sponge Cake | | | | | | | |
| Product of Example | 4 | 5 | 7 | 9 | 11 | 12 | 13 |
| Amount in grams | 200 | 200 | 53 | 53 | 53 | 53 | 53 |
| Water - cc. | 90 | 90 | 240 | 240 | 240 | 240 | 240 |
| Emulsifier [1] | 21.5 | 22 | 22 | 22 | 22 | 22 | 22 |
| Mixing Schedule | 1 | 1 | 1 | 1 | 1 | 2 | 2 |
| Specific Gravity (Batter) | .51 | .50 | .50 | .50 | .52 | .50 | .50 |
| Temperature ° C. | 25 | 23.9 | 24.4 | 25 | 24.4 | 24.4 | 24.4 |
| Weight, grams (cake) | 240 | 236 | 233 | 236 | 232 | 234 | 230 |
| Volume, cc. (Cake) | 1025 | 1070 | 1060 | 1010 | 960 | 990 | 970 |
| Specific Volume | 4.27 | 4.53 | 4.55 | 4.28 | 4.28 | 4.25 | 4.15 |
| Remarks | | | | | | Ice Water | Ice Water |

Mixing Schedule:
Time/Speed
1. 4/3 2d; 100 cc. water; 3/3 2d; 50 cc. water; 3/3 2d
2. 4/3 2d; 150 cc. water; 4/3 2d
3. 4/3 2d; 100 cc. water; 3/3 2d; 50 cc. water; 3/3 2d
4. 3/3 2d; 150 cc. water; 4/3 2d
5. 3/3 2d; 150 cc. water; 5/3 2d
6. 4/3 2d; 150 cc. water; 5/3 2d
7. 4/3 2d; 100 cc.; 2/3 2d; 100 cc; 3/3 1/2 speed
8. 4/3 1/2; 150 cc.; 5/3 1/2
9. 4/3 1/2; 150 cc.; 4/3 1/2
10. 1/1; 4/3 1/2; add 150 cc. water; 1/1; 4/3 1/2

[1] G-2462

Ingredients not preblended, but blended during batter manufacture.

| EXAMPLE NO. | 83 | 84 | 85 | 86 | 87 | 88 | 89 |
|---|---|---|---|---|---|---|---|
| Sponge Cake | | | | | | | |
| Product of Example | 15 | 15 | 15 | 15 | 21 | 22 | 23 |
| Amount in grams | 200 | 200 | 53 | 53 | 53 | 53 | 53 |
| Water - cc. | 90 | 90 | 240 | 235 | 235 | 235 | 235 |
| Emulsifier [1] | 22 | 16 | 22 | 22[B] | 22[C] | 22 | 22 |
| Mixing Schedule | 3 | 3 | 4 | 5 | 6 | 4 | 4 |
| Specific Gravity (Batter) | .48 | .49 | .50 | .62 | .54 | .50 | .49 |
| Temperature ° C. | 25 | 22.2 | 22.8 | 22.2 | 22.2 | 22.2 | 22.8 |
| Weight, grams (cake) | 230 | 240 | 240 | 255 | 245 | 240 | 240 |
| Volume, cc. (Cake) | 990 | 1090 | 990 | 940 | 890 | 990 | 1025 |
| Specific Volume | 4.30 | 4.54 | 4.12 | 3.67 | 3.63 | 4.13 | 4.27 |
| Remarks | Ice Water | | | Unacceptable | | | |

[1] G-2462
[B] Carlton 1100
[C] Kyowa Este

Ingredients not preblended, but blended during batter manufacture.

| EXAMPLE NO. | 90 | 91 | 92 | 93 | 94 | 95 | 96 |
|---|---|---|---|---|---|---|---|
| Sponge Cake | | | | | | | |
| Product of Example | 24 z | 25 | 26 | 21 | 22 | 23 | 24 |
| Amount in grams | 53 | 53 | 53 | 53 | 53 | 53 | 53 |
| Water - cc. | 235 | 235 | 235 | 235 | 235 | 235 | 235 |
| Emulsifier [1] | 22 | 22 | 22 | 22 | 22 | 22 | 22 |
| Mixing Schedule | 4 | 2 | 6 | 6 | 6 | 6 | 6 |
| Specific Gravity (Batter) | .495 | .49 | .49 | .475 | .48 | .48 | .49 |
| Temperature ° C. | 23.3 | 24.4 | 25.6 | 24.4 | 25 | 25 | 26.1 |
| Weight, grams (cake) | 239 | 238 | 237 | 241 | 232 | 240 | 237 |
| Volume, cc. (Cake) | 1025 | 1035 | 1060 | 1090 | 1030 | 1070 | 1045 |
| Specific Volume | 4.29 | 4.35 | 4.47 | 4.52 | 4.44 | 4.46 | 4.41 |
| Remarks | | | | | | | |

[1] G-2462

Ingredients not preblended, but blended during batter manufacture.

| EXAMPLE NO. | 97 | 98 | 99 | 100 | 101 | 102 | 103 |
|---|---|---|---|---|---|---|---|
| Sponge Cake | | | | | | | |
| Product of Example | 25 | 26 | 29 | 31 | 29 | 31 | 34 |
| Amount in grams | 53 | 53 | 53 | 160 | 53 | 160 | 53 |
| Water - cc. | 235 | 235 | 235 | 125 | 235 | 125 | 235 |
| Emulsifier [1] | 22 | 22 | 22 | 16 | 22 | 16 | 20 |
| Mixing Schedule | 6 | 6 | 7 | 8 | 9 | 9 | 10 |

TABLE III-continued

| | | | | | | | |
|---|---|---|---|---|---|---|---|
| Specific Gravity (Batter) | .49 | .48 | .48 | .51 | .48 | .47 | .47 |
| Temperature °C. | 25.6 | 25.6 | 30.6 | 25.6 | 23.9 | 23.9 | 23.9 |
| Weight, grams (cake) | 241 | 242 | 238 | 223 | 222 | 230 | 226 |
| Volume, cc. (Cake) | 1060 | 1070 | 1055 | 1030 | 990 | 1060 | 1085 |
| Specific Volume | 4.40 | 4.42 | 4.43 | 4.62 | 4.46 | 4.61 | 4.8 |
| Remarks | | | | | Ingredients mixed while mixing cake batter | | |
| | | | | | Results same whether premix or mixing during batter making as used. | | |

G-2462
Ingredients not preblended, but blended during batter manufacture.

| EXAMPLE NO. | 104 |
|---|---|
| Sponge Cake | |
| Product of Example | 36[1] |
| Amount in grams | 53 |
| Water - cc. | 235 |
| Emulsifier [1] | 20 |
| Mixing Schedule | 9 |
| Specific Gravity (Batter) | .47 |
| Temperature °C. | 25 |
| Weight, grams (cake) | 225 |
| Volume, cc. (Cake) | 1100 |
| Specific Volume | 4.90 |
| Remarks | Bake at 29' at 193.3° C. No difference ingredients preblended or mixed with batter. |

G-2462
Ingredients not preblended, but blended during batter manufacture.

EXAMPLES 105-135

The whole egg substitutes of the present invention were evaluated in devil's food cake. The devil's food cake was prepared by blending the following ingredients:

| | |
|---|---|
| Devil's food base mix (see below) | 630 grams |
| Shortening | (See Table IV) |
| Emulsifier (Atmul-80) | (See Table IV) |
| Whole egg replacement of the present invention | (See Table IV) |
| Water (Ice) | (See Table IV) |
| Base Cake Mix | Grams |
| Sugar | 304 |
| Cake flour | 252 |
| NFDM superheat | 21 |
| Cocoa-Dutch process | 35 |
| Salt | 5 |
| Baking powder | 10 |
| Bicarbonate of soda | 4 |
| | 631 |

The dry ingredients of the base mix were blended with the shortening and emulsifier. Ice water was added and the blend mixed according to the mixing schedule given in Table IV. Two additional amounts of water (100 cc.) were added during mixing as indicated. The mixing bowl was scraped down several times during mixing. The specific gravity of the batter was determined 0.90–0.93 being preferred. The batter was baked into cakes as 82.2° C. for 27 minutes. The cake was weighed and its volume determined. The results are reported in Table IV. The amount of product of the preceding example, the shortening and the emulsifier is in grams.

TABLE IV

| EXAMPLE NO. | 105 | 106 | 107 | 108 | 109 | 110 |
|---|---|---|---|---|---|---|
| Devil's Food Cake | | | | | | |
| Product of Example | 5 | 5 | 6 | 8 | 10 | 12 |
| Amount | 150 | 150 | 150 | 40 | 40 | 40 |
| Water Cubic Centimeters | 50 | 50 | 50 | 160 | 160 | 160 |
| Shortening | 81 | 81 | 81 | 81 | 81 | 81 |
| Emulsifier [1] | 9 | 9 | 9 | 9 | 9 | 9 |
| Mixing Schedule | 1 | 1 | 2 | 2 | 2 | 2 |
| Specific Gravity (Batter) | .87 | .88 | .89 | .89 | .89 | .89 |
| Temperature of Measurement °C. | 20.6 | 20.6 | 20.6 | 21.1 | 21.7 | 22.2 |
| Weight (grams) | 350 | 364 | 359 | 358 | 360 | 364 |
| Volume (cc) | 1250 | 1280 | 1310 | 1200 | 1230 | 1270 |
| Specific Volume (Cake) | 3.57 | 3.52 | 3.65 | 3.35 | 3.42 | 3.49 |
| Remarks | | Additional 2 grams sodium bicarbonate slight dip in center | | | Slight dip in Center. | |

TABLE IV-continued of cake.

Mixing Schedule:
1. 1/slow, 2 1/2 medium; * 1/slow, 2 1/2/medium; ** 1 1/2/slow
2. 1/slow, 2 1/2/medium; * 1/slow, 2 1/2 medium; ** 2/slow
3. 3/medium; * 3/medium; ** 2/slow
4. 2 1/2/medium; ** 2/slow
5. 1/slow, 3/medium; * 1/slow, 3/medium; ** 2/slow
*add 100 cc. water
** add 100 cc. water
'Atmul-80

| EXAMPLE NO. | 111 | 112 | 113 | 114 | 115 | 116 |
|---|---|---|---|---|---|---|
| Devil's Food Cake | | | | | | |
| Product of Example | 13 | 14 | 15 | 16 | 16 | 16$^C$ |
| Amount | 40 | 40 | 40 | 150 | 150 | 150 |
| Water Cubic Centimeters | 160 | 160 | 160 | — | — | 50 |
| Shortening | 81 | 81 | 81 | 81 | 83 | 82.8 |
| Emulsifier $^1$ | 9 | 9 | 9 | 9 | 7.2$^H$ | 7.2$^H$ |
| Mixing Schedule | 2 | 2 | 2 | 2 | 2 | 2 |
| Specific Gravity (Batter) | .89 | .90 | .92 | .91 | .81 | .93 |
| Temperature of Measurement ° C. | 21.7 | 21.7 | 21.1 | 21.7 | 22.2 | 21.1 |
| Weight (Cake) | 360 | 358 | 322 | 365 | 365 | 360 |
| Volume (Cake) | 1330 | 1310 | 1130 | 1230 | 1330 | 1320 |
| Specific Volume (Cake) | 3.69 | 3.66 | 3.50 | 3.33 | 3.64 | 3.66 |
| Remarks | | | | | | |

G-2462

| EXAMPLE NO. | 117 | 118 | 119 | 120 | 121 | 122 |
|---|---|---|---|---|---|---|
| Devil's Food Cake | | | | | | |
| Product of Example | 16$^C$ | 16$^C$ | 22 | 22 | 23 | 24 |
| Amount | 150 | 150 | 40 | 40 | 40 | 40 |
| Water Cubic Centimeters | 50 | 50 | 160 | 160 | 160 | 160 |
| Shortening | 81 | 82.8 | 82.8 | 82.8 | 82.8 | 82.8 |
| Emulsifier $^1$ | 9 | 7.2$^H$ | 7.2$^H$ | 7.2$^H$ | 7.2$^H$ | 7.2$^H$ |
| Mixing Schedule | 2 | 2 | 3 | 4 | 5 | 5 |
| Specific Gravity (Batter) | .87 | .89 | .89 | .90 | .87 | .86 |
| Temperature of Measurement ° C. | 19.4 | 19.4 | 20.6 | 20.6 | 21.1 | 20.6 |
| Weight (Cake) | 360 | 360 | 341 | 352 | 335 | 339 |
| Volume (Cake) | 1320 | 1380 | 1295 | 1255 | 1175 | 1240 |
| Specific Volume (Cake) | 3.66 | 3.83 | 3.60 | 3.57 | 3.51 | 3.66 |
| Remarks | | | | Unacceptable | | |

Blend prepared on commercial equipment, pasteurized and frozen.
'Carlton 1100

| EXAMPLE NO. | 123 | 124 | 125 | 126 | 127 | 128 |
|---|---|---|---|---|---|---|
| Devil's Food Cake | | | | | | |
| Product of Example | 25 | 26 | 27 | 22 | 23 | 16$^C$ |
| Amount | 40 | 40 | 40 | 40 | 40 | 40 |
| Water Cubic Centimeters | 160 | 160 | 160 | 160 | 160 | 160 |
| Shortening | 83 | 83 | 83 | 83 | 83 | 90 |
| Emulsifier $^1$ | 7.0$^H$ | 7.0$^H$ | 7.0$^H$ | 7.0$^H$ | 7.0$^H$ | — |
| Mixing Schedule | 5 | 5 | 5 | 5 | 5 | 5 |
| Specific Gravity (Batter) | .87 | .87 | .91 | .87 | .825 | .78 |
| Temperature of Measurement ° C. | 20.0 | 21.1 | 22.2 | 21.1 | 21.1 | 20 |
| Weight (Cake) | 337 | 336 | 337 | 339 | 336 | 338 |
| Volume (Cake) | 1150 | 1175 | 1135 | 1225 | 1225 | 1110 |
| Specific Volume (Cake) | 3.41 | 3.5 | 3.37 | 3.61 | 3.64 | 3.28 |
| Remarks | | | | | | Unacceptable |

| EXAMPLE NO. | 129 | 130 | 131 | 132 | 133 | 134 |
|---|---|---|---|---|---|---|
| Devil's Food Cake | | | | | | |
| Product of Example | 31 | 30 | 16$^C$ | E1, P I | 32 | 30 |
| Amount | 40 | 40 | 150 | 40 | 40 | 40 |
| Water Cubic Centimeters | 160 | 160 | 50 | 160 | 110 | 160 |
| Shortening | 83 | 81 | 81 | 81 | 83 | 83 |
| Emulsifier $^1$ | 7$^H$ | 9 | 9 | 9 | 7$^H$ | 7$^H$ |
| Mixing Schedule | 5 | — | — | — | 5 | 3 |
| Specific Gravity (Batter) | .89 | .97 | .88 | .95 | .89 | .87 |
| Temperature of Measurement ° C. | 22.8 | 21.7 | 21.1 | 21.7 | 20.6 | 20 |
| Weight (Cake) | 334 | 338 | 338 | 338 | 340 | 333 |
| Volume (Cake) | 1200 | 1120 | 1170 | 1160 | 1170 | 1185 |
| Specific Volume (Cake) | 3.59 | 3.31 | 3.46 | 3.43 | 3.44 | 3.56 |
| Remarks | | | | Unacceptable. Tunnels, split coarse grain. | | |

EXAMPLE 135

A baked custard was prepared using the composition of the invention by blending 450 cc. of scalded milk with 68 grams of sugar, 2 grams salt and 100 grams of the product of Example 32. The custard was baked for 50 minutes at 182.2° C. in a water bath. Custard was judged excellent.

EXAMPLE 136

A pumpkin pie was prepared using the composition of the invention by blending 820 grams canned pumpkin, 230 grams light brown sugar, 15 grams corn starch, 5 grams of spice including all spice, ginger, vanilla and cinnamon, 3 grams salt, 62 grams molasses, 200 grams of the product of Example 32 and 715 cubic centimeters of liquid whole milk. The pie was baked at 226.7° C. for 52 minutes. The taste, color and overall appearance were excellent.

EXAMPLE 137

A mayonaise was prepared by blending together the following ingredients:

|  | Grams | Percent |
|---|---|---|
| Liquid Fresh Yolk | 40 | 4.7 |
| Product Example 33 | 10 | 1.18 |
| Carlton 1100 hydrated | 30 | 3.53 |
| Vinegar | 50 | 5.9 |
| Salt | 10 | 1.18 |
| Sugar | 10 | 1.18 |
| Cottonseed Oil | 700 | 82.3 |
|  | 850 | 99.97 |

Blend dry ingredients and incrementally blend vinegar and oil to dry blend. Product has excellent consistency.

What is claimed is:

1. The process of preparing a whole egg replacer base comprising the steps of:
   providing from about 40% to 95% of a high protein content material prepared by combining non-elastic protein material, oil and salt and heating at a low simmering temperature,
   adding a mild acid to the foregoing and continuing heating for a period of time sufficient to bring out flavor characteristics,
   adding water and vegetables and boiling;
   adding additional water and non-elastic protein material and continuing boiling,
   adding a thickening agent and continuing boiling to obtain a material of high protein content; and,
   adding to the high protein content material:

| food grade emulsifier | 2–12% (active ingredient basis) |
|---|---|
| a gum | 0.75–1.5% |
| pregelatinized starch | 4–12% |
| dextrin | 2–12% |
| lecithin | 0–12% |
| appearance agent | 0–15% |
| texturizing agent selected from the group consisting alginate, carrageenan and mixtures thereof | 0–4% |
| neutralizer | 0–5% |
| all percentages being by weight. | |

2. The product produced in accordance with the process of claim 1.

3. The process according to claim 1 wherein said gum is guar gum.

4. The process according to claim 1 wherein said food grade emulsifier is selected from the group consisting of mono- and diglycerides, sorbitan monostearate, polyoxyethylene sorbitan fatty acid esters, dioctyl sodium sulfosuccinate and lecithin.

5. The process according to claim 1 wherein said neutralizer is bicarbonate of soda.

6. The process of claim 5 wherein said appearance agent, said texturizing agent and said bicarbonate of soda comprise in percent by weight:

| Appearance agent | 5 – 15 |
|---|---|
| Texturizing agent | 1 – 4 |
| Bicarbonate of soda | 1 – 4 |

7. A whole egg replacer comprising a blend of an effective amount of whole egg replacer base product of claim 1 and eggs or egg components.

8. A whole egg replacer as recited in claim 7 comprising from about 5 to about 45% by weight of said whole egg replacer base and from about 95 to about 55% by weight eggs or egg components.

9. The composition as recited in claim 7 which further includes from about 15 to about 50% water.

10. The composition as recited in claim 7 which further includes from about 1 to about 4% dextrin.

11. A dry whole egg replacer comprising from about 25 to about 60% of the whole egg replacer base product of claim 1, dry whole eggs in an amount ranging from about 25% to about 60%, and dried albumen in an amount ranging from about 10 to about 20%.

12. The dry whole egg replacer as recited in claim 11 which further includes from about 5 to about 16% dextrin.

13. A liquid whole egg replacer which comprises from about 9 to about 37% by weight of the whole egg replacer base product of claim 1, liquid whole egg in an amount ranging from about 30 to 60% by weight and liquid egg white in an amount ranging from about 30 to about 40% by weight.

14. The liquid whole egg replacer as recited in claim 13 which further includes dextrin in an amount ranging from about 1 to about 4%.

15. A kosher egg replacer base comprising from about 40 to about 60% of the high protein content material as recited in claim 1, from about 3% to about 6% of a food grade emulsifier, from about 3 to about 7% lecithin and from about 25 to about 35% dextrin.

16. A kosher whole egg replacer comprising equal parts of the product of claim 15 and dry egg yolk.

17. Bakery goods prepared using the product of claim 7.

18. The product of claim 15 which further includes from about 1 to about 2% of a neutralizer and from about 5 to about 15% of an appearance agent.

* * * * *

UNITED STATES PATENT AND TRADEMARK OFFICE
CERTIFICATE OF CORRECTION

PATENT NO. : 4,120,986
DATED : October 17, 1978
INVENTOR(S) : Charles C. Lynn

It is certified that error appears in the above-identified patent and that said Letters Patent are hereby corrected as shown below:

Column 1, line 25, "sacharides" should be -- saccharides --.

Column 9, Table I, at the end of "Part I" (the footnotes) before the word "Atlas", please insert -- (A) -- and before the word "Thawed", please insert -- (B) --.

Column 11, at the first footnotes, before the word "Hydroxylated", please insert -- (C) -- and before the word "Shortening", please insert -- (D) --.

Column 11, the footnotes after "Part II", first occurrence, before the word "Alternate", please insert -- (E) -- and before the word "Flour", please insert -- (F) --.

Column 11, the footnotes after "Part II" second occurrence, before the word "Product", please insert -- (G) --, before the word "Atmul", please insert -- (H) --, before the word "Myverol", please insert -- (I) --, before the word "Myverol", please insert -- (J) --, before the word "Addition", please insert -- (K) --, before the word "Myverol", please insert -- (L) --, before the word "Myverol", please insert -- (M) --, before the word "Product", please insert -- (N) --, and before the numbers "2%", please insert -- (O) --.

Column 13, Table II, after Examples 41-46 in the footnotes, before the word "Prepared", please insert -- (A) --.

UNITED STATES PATENT AND TRADEMARK OFFICE
CERTIFICATE OF CORRECTION

PATENT NO. : 4,120,986
DATED : October 17, 1978
INVENTOR(S) : Charles C. Lynn

It is certified that error appears in the above-identified patent and that said Letters Patent are hereby corrected as shown below:

Column 15, Table II, after Examples 46-50 in the footnotes, before the word "Dried", please insert -- (B) --.

Column 15, Table II, after Examples 56-60 in the footnotes, before the word "Used", please insert -- (C) -- and before the word "Used" (next line), please insert -- (D) -- and before the word "Ingredients" (3rd line of footnotes), please insert -- (E) --.

Column 17, Table III, after Examples 76-82 in the footnotes, before the word "G-2462", please insert -- (A) -- and before the word "Ingredients" (next footnote), please insert -- (D) --.

Column 17, Table III, after Examples 83-89 in the footnotes, before the word "G-2462" please insert -- (A) -- and before the word "Carlton", please insert -- (B) -- and before the word "Kyowa", please insert -- (C) -- and before the word "Ingredients", please insert -- (D) --.

Column 17, Table III, after Examples 90-96 in the footnotes, before the word "G-2462", please insert -- (A) -- and before the word "Ingredients", please insert -- (D) --.

Column 19, Table III, after Examples 97-103 in the footnotes, before the word "G-2462", please insert -- (A) -- and before the word "Ingredients", please insert -- (D) --.

UNITED STATES PATENT AND TRADEMARK OFFICE
CERTIFICATE OF CORRECTION

PATENT NO. : 4,120,986
DATED : October 17, 1978
INVENTOR(S) : Charles C. Lynn

It is certified that error appears in the above-identified patent and that said Letters Patent are hereby corrected as shown below:

Column 19, Table III, after Example 104 in the footnotes, before the word "G-2462", please insert -- (A) -- and before the word "Ingredients", please insert -- (D) --.

Column 21, Table IV, after Examples 105-110 in the footnotes, before the word "Atmul-80", please insert -- (A) --.

Column 21, Table IV, after Examples 111-116 in the footnotes, before the word "G-2462", please insert -- (B) --.

Column 21, Table IV, after Examples 117-122 in the footnotes, before the word "Blend", please insert -- (C) --, and before the word "Carlton", please insert -- (D) --.

Signed and Sealed this

Fifth Day of June 1979

[SEAL]

Attest:

RUTH C. MASON
Attesting Officer

DONALD W. BANNER
Commissioner of Patents and Trademarks